US005883804A

United States Patent [19]

Christensen

[11] Patent Number: 5,883,804

[45] **Date of Patent: *Mar. 16, 1999**

[54] MODULAR DIGITAL AUDIO SYSTEM HAVING INDIVIDUALIZED FUNCTIONAL MODULES

[75] Inventor: Steven G. Christensen, Minneapolis, Minn.

[73] Assignee: Telex Communications, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 687,804

[22] Filed: Jul. 19, 1996

Related U.S. Application Data

[63] Continuation of Ser. No. 490,457, Jun. 14, 1995, abandoned.

[51] Int. Cl.[6] .......... G06F 3/16

[52] U.S. Cl. .......... 364/400.01

[58] Field of Search .......... 364/DIG. 1, DIG. 2, 364/400.01; 370/263, 267; 379/158, 206; 381/77; 395/788, 118, 501, 502, 503, 504, 505, 519; 704/1, 2, 3

[56] References Cited

U.S. PATENT DOCUMENTS 4,574,845 3/1986 Alexander, III .......... 242/35.5
5,357,511 10/1994 DiNapoli et al. .......... 370/263

OTHER PUBLICATIONS

Moorer, J.A., et al., "The Digital Audio Processing Station: A New Concept in Audio Postproduction", *Journal of The Audio Engineering Society,* vol. 34, No. 6, pp. 454–463, (Jun. 1986).

*Primary Examiner*—Robert B. Harrell
*Attorney, Agent, or Firm*—Schwegman, Lundberg, Woessner, and Kluth, P.A.

[57] ABSTRACT

A system for recording, editing, processing and playing digital audio in a real-time, non-linear, non-destructive fashion. The system comprises a collection of the following modules: a disk controller for reading and writing disk-based media: an I/O processor for moving data between the disk controllers, I/O devices and connection bus, a DSP processor for processing data that exists on the connection bus, and a sample playback processor for performing memory-based polyphonic digital playback attached to the connection bus. The system's modules are connected via a connection bus that allows the transfer of multiple channels of information simultaneously in synchronism with the system's variable sample clock.

14 Claims, 5 Drawing Sheets

SYSTEM COMPONENTS CONNECTION

MODULAR DIGITAL AUDIO SYSTEM HAVING INDIVIDUALIZED FUNCTIONAL MODULES

This is a continuation of application Ser. No. 08/490,457, filed Jun. 14, 1995, now abandoned.

FIELD OF THE INVENTION

The present invention relates to digital audio workstations, that is, systems that are capable of capturing audio information, storing it in digital form, manipulating and processing the audio data while in digital form, and playing back the resultant audio data in digital and/or analog form, but may also be integrated with other equipment, such as video equipment.

BACKGROUND OF THE INVENTION

Digital audio workstations (DAWs) have existed ever since the invention of the compact disc commercialized applications for the digitization and processing of audio in the early 1980s. Early systems were based upon the storage of the digitized audio on magnetic tape. The linearity and thus inability of tape-based systems to instantaneously fast forward, rewind or play non-contiguous sections of audio without interruption led to the development of disk-based systems. By storing the digitized audio data on a rotating magnetic or optical disk, the disk's head assembly could rapidly be moved to non-contiguous locations much faster than the audio itself needed to be played back. By appropriate buffering of the data coming from the disk, real-time, non-linear playback of audio was possible. A similar development has occurred in the video world, such that nonlinear editing and post-production systems are now commercially available.

Commercial success of DAWs was limited by long development cycles, high cost, and low-performance technology. The popularization of the personal computer made enormous price/performance improvements in DAWs possible. In commercial or professional audio recording studio, the audio recording and playback process is only one part of the overall function of the studio. This process was previously performed by analog or digital tape-based recorder/players. With the price of a digital disk-based solution dropping, and the availability of low-cost, high performance general-purpose purpose digital signal processors (DSPs), it became feasible to include other studio functions within the DAW itself. Such functions as mixing and signal processing are ideal for performance on DSPs. One can see that an eventual goal is to replicate the complete functioning of an audio recording studio within the confines of a DAW.

By building a DAW around a commercially available personal computer three advantages were obtained. First, the development time no longer included designing a controlling computer and associated hardware and software. Second, a familiar and graphical user interface could be presented from which all DAW functions could be easily and intuitively controlled. And third, the expansion bus of the personal computer provided a standard, low-cost way to add additional hardware functionality to the system.

The difficulties now faced by system designers include questions of how to fit all of the hardware needed to emulate the functioning of an audio recording studio into the personal computer, how to partition and connect the functionality most efficiently and cost-effectively, how to design the software that runs on and controls the system hardware, how to integrate the functioning of the DAW with the functioning of the computer itself, and how to allow for system reconfiguration and expandability. Previous inventions have attempted to address only a subset of the above difficulties.

The New England Digital Synclavier Direct-to-Disk hard disk recorder was one of the first commercial attempts. It succeeded in producing a relatively low performance audio recorder. It was extremely expensive, being made of entirely custom components, and lacked internal mixing, signal processing and expandability. It was, however, well integrated with its internal sampling processor. The Synclavier consisted of a plurality of hard disk modules, each one adding more tracks of hard disk playback and recording. The hard disk modules all connected into a central controller that allowed a very limited pre-scripted level and pan control during playback. There was no signal processing available or possible within the system, nor was there a connection bus. There was a sampler module integrated with the system and, in fact, the level and pan controls of the outputs of the sampler module were used to process the hard disk playback data.

The SoundDroid from Lucas Film (DroidWorks), and its Audio Signal Processor (ASP) was another early attempt. It combined a disk controller and signal processors, but it again was built from custom components, and never achieved commercialization. It did not include a digital sampling module, nor was expansion designed into it. DroidWorks is a division of Lucas Film. In a November 1986 Audio Engineering Society convention preprint entitled "An Optical Disk Recording, Archiving, and Editing Device For Digital Audio Signal Processing" by James A. Moorer and Jeffrey Borish, a device called a DAB, or digital audio board, is described. It is essentially a VME circuit board that has disk and I/O interfaces and a DSP on board. More than one could exist on a back plane of a computer, but each board was essentially autonomous. All audio has to be routed through a single DSP on the board. This board was designed mostly as an I/O board for a larger SoundDroid system. The SoundDroid is discussed in "Digital Audio Processing Station: A New Concept In Audio Post-Production" by James A. Moorer, et al., *Journal of The Audio Engineering Society,* 34:6, June 1986, pp. 454–463.

The ASP board is another component of the SoundDroid system. The system consisted of multifunction cards but with very little communication between them. Rather than an integrated connection bus, they have general purpose EtherNet interfaces, to use mainly for control as opposed to audio transfer. Audio processing occurs only within individual boards in the system. RAM-based polyphonic sample playback is not performed. It is understood that the product never was completed or produced.

The Pro Tools I System made available by Digidesign, Inc. contains a disk interface card with no I/O, multiple I/O cards that also had two DSPs on them used for dedicated mixing and signal processing, and a sampler card that has no digital outputs. The system was modular, but had no digital audio connection bus nor a general purpose pool of DSPs.

The AudioFrame 1000 from WaveFrame of Boulder, Colo. (now owned by TimeLine Vista Inc. of Vista, Calif.) was a 24 channel hard disk recorder based upon a set of custom circuit boards, but the whole set of boards was controlled by a commercially available IBM-type PC. It had a disk interface, a sample playback processor, and a signal processor, as well as a connection bus to interface at least some of these units. However, the signal processor was dedicated to performing specific functions such as equalization and mixing and the system did not allow customization via adding and removing modules.

Spectral Synthesis Inc. Of Woodinville, Wash. produced a pair of boards that fit inside a commercially available IBM-type PC. The audio frame consisted of a custom bus and card cage attached via an interface card to, as mentioned, an IBM-type PC which is used only for control and user interface. The card cage could accommodate one each of three different card types: a hard disk recorder card, a sampler card and a DSP card. However, there could not have been more than one of each card type and no further DSP card could be mounted on the system. The DSP card performed mixing, EQ, reverberation and compression. It was fairly reconfigurable, but only within that one card. A 64 time slot TDM bus connected the three cards, so that hard disk data and sampler data could be mixed together and processed. The system allowed 12 channels of hard disk playback and recording, and a fixed, limited amount of signal processing. There was a connectivity bus between the two cards, but it was very limited in capacity and not designed for expansion. While the system was not expandable, the connector between the cards implemented some type of multiplex bus of about eight time slots that pass data between the two cards.

U.S. Pat. No. 5,357,511 issued Oct. 18, 1994 to DiNapoli et al. describes not a DAW, but a digital mixing console. The modules of this console were all identical, and each perform all the individual system tasks of 1/0, mixing and routing. As can be ascertained from the patents, the user could only add more of the same functionality. Hard disk recording and sample playback are not a part of this system. The patent, however, does disclose a connection bus for interconnecting the modules in the system.

Another company, Sonic Solutions of Novato, Calif., currently produces a system that includes a disk controller, a DSP processor and I/O processor on a single NuBus card. A number of such identical multifunction NuBus cards may be provided to fit into Apple Macintosh computers. The cards have a type of very low capacity bus connected between them to allow several channels of data to be sent to up to one more cate per channel for processing. The code running on the DSP processors is somewhat configurable, but the DSPs are allocated to specific functions and are not implemented as a plurality of general purpose DSPs, as in the present invention. It is only expandable in a limited way to two more of those cards for processing two channels of audio, and does not incorporate sample playback processing described below in reference to the present invention. There is no specific or equivalent to a connection bus for the cards within the system, and it is believed to use a private disk controller system, so their disks and files cannot be seen by the user of the host computer.

SUMMARY OF THE INVENTION

The present invention ameliorates the shortcomings of the prior art systems, some of which are discussed above and make it possible to perform audio recording, editing, mixing, processing and playback functions of an audio recording studio, entirely within a DAW based on a personal computer. The invention is composed of low-cost modules that are connectable, expandable and programmable, allowing the most efficient and cost-effective usage of available system resources. It takes full advantage of features supplied by the personal computers operating system software and built-in hardware, further lowering system costs.

According to the present invention, a DAW system (exclusive of the personal computer and its peripherals) is comprised of a number of modules or cards connected together via two buses, a computer system expansion bus and a connection bus. The present invention defines four distinct types of modules, although any number of each type of module may be present in a system. The total number and type of modules will be determined by a particular user's system needs and available expansion slots in their computer. The system preferably comprises four modules—a disk controller module, an I/O processor module, a DSP module, and a sampled sound module, although not all four may be present in the configuration of a given system.

The disk controller module according to the present invention includes a disk interface device, to which disk-based or other digital storage devices can be attached. The memory attached to the disk interface device stores both instructions for the disk interface device, as well as data being sent to or from the storage devices. A second, separate bank of memory may optionally serve as a data buffer for data being sent to or from the storage devices. This disk controller module includes an interface to the computer's expansion bus, and an optional interface to an I/O processor module. The disk controller performs the task of reading and writing data to and from the storage modules, and to and from any memory attached to it, or to and from other sources and destinations via the computer's expansion bus.

The I/O processor module according to the present invention includes a processor, for example a digital signal processor (DSP), an interface to the host computers expansion bus, an optional interface to external analog and digital inputs and outputs to and from the DAW (I/O devices), and an optional interface to a disk controller module. The I/O processor may additionally contain an interface to the DAW's connection bus. The DSP performs the task of moving data between and among an attached disk controller's disk buffer, the I/O devices, and the connection bus. Memory may be optionally connected to the DSP. The host computer may be any personal computer with an expansion bus, but preferably is an Apple Macintosh computer made by Apple Computer of Cupertino, Calif., especially the Quadra 950 model.

The DSP processor module according to the present invention includes one or more processors, for example a digital signal processor (DSP), an interface to the computer's expansion bus, and an optional interface to the DAW's connection bus. The DSPs perform the task of either processing data from the connection bus and returning processed data back to the connection bus, processing data from the connection bus for internal use, such as a meter display or other such user interface device, or synthesizing audio data on its own for transmission to the connection bus.

The Sampled Sound Processor module according to the present invention includes a processor, some attached read-only or read/write memory, preferably 2 to 32 megabytes of memory, an interface to the computer's expansion bus, and optionally an interface to the DAW's connection bus. In addition, analog and/or digital I/O devices may be directly connected to the processor. The processor is responsible for reading multiple channels of audio data stored in memory, applying specific operations to the audio such as pitch adjustment, amplitude adjustment, mixing and other processing operations. The resultant audio data may be transmitted via directly attached I/O devices, or sent to the DAW's connection bus.

DESCRIPTION OF THE PREFERRED EMBODIMENTS

Figure 1:
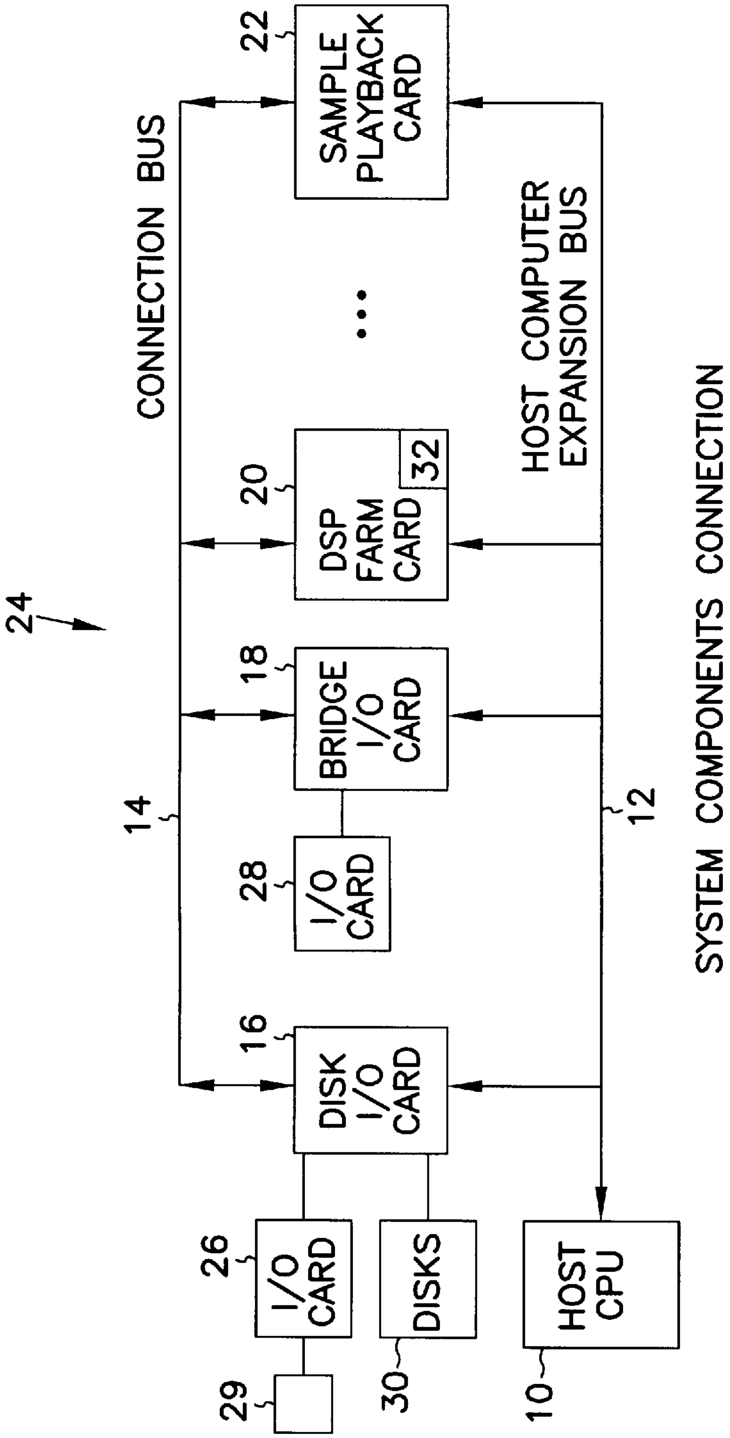
FIG. 1 is a schematic which illustrates the overall organization and structure of the computer system of the present invention.

The present invention is embodied as a series of personal computer expansion cards (in this case, NuBus cards for the Apple Macintosh computers), external input/output and system synchronization boxes connected to the expansion cards, computer programs running on the host computer and on processors in the expansion cards, and a separate connection bus connecting these cards. The expansion cards are composed of one or more of the four module types described above.

A given system can be composed of any number of any of these cards and interfaces, subject to the restriction that, since each card occupies one expansion slot of the host computer, the number of expansion slots available on a given computer and the availability of additional expansion slots for that computer, will limit the number of cards it can accommodate at one time.

The software that is programmed to run on the host computer is preferably the Pro Tools software available from Digidesign, Inc., and currently requires a minimum of 1 and a maximum of 3 Disk I/O cards, although there is no actual restriction on this number. In fact, many third party companies write software for this system as a platform, and their software may have greater or lesser restrictions as well. Examples of such software include StudioVision from Opcode Systems, Inc. of Palo Alto, Calif.; Logic Audio from Emagic gmbH of Germany; Digital Performer from Mark of the Unicorn of Massachusetts; and Cubase Audio from Steinberg Soft und Hardware gmbH of Germany.

An I/O interface box can only connect to a Disk I/O card or Bridge I/O card, although there is no restriction, other than software implementation and the need for a source of system clock for synchronization, that requires more than one to be connected in a system at all. An I/O interface box can only connect to a disk I/O card or bridge I/O card because an I/O interface connector is only available on such cards. DSP Farm and Sampler cards (to be described in detail below) have no I/O interface connectors on them. The Sampler card has discrete connectors, for output only, mounted directly on the card itself.

The system of the present invention differs from the prior art in several distinct and important ways which result in increased flexibility and computer system efficiency. Each individual card, and often several components on a card, are all attached to the same connection bus so that they may freely share information. This allows the system to be truly modular and expandable. Third-party add-in hardware may be made available for the system. Such third-party products attach to the same connection bus, and become fully integrated into the system of the present invention as a result.

Prior art systems either do not use connection busses or, if they do, they are proprietary systems which can connect at the most several components. The generality and expansion possibilities do not exist, and since all system modules are not capable of communicating with each other, system routing, configuration and resource allocation are very restricted. The WaveFrame product is somewhat related to the connection bus of the present invention, but that bus was of lower capacity, and was used to connect the 3 modules a system was composed of, and did not allow for modularity, reconfigurability and expandability.

In the system of the present invention, functionality is partitioned into specific card types, so that the user can add more of less of a specific feature or features, without having to add more or less of other unwanted features. Some prior art systems consisted of feature-specific modules, such as the WaveFrame product, but none of the systems the inventors are aware of were designed to be expandable by adding more of those modules. Still other systems were composed of multiple numbers of the exact same module, such as that shown in the system described in U.S. Pat. No. 5,357,511. If a user of that system described in the patent simply wanted to add just more I/O functionality, the user would be required to buy more of everything else as well.

The DSP Processing Module of the present application is comprised of non-dedicated, general-purpose DSP computing resources organized into DSP Farms. DSP Farms mean, for the purposes of the present invention, a collection of DSP or other processing circuits mounted on a card or module. The system allows the user to decide which functions are run on the DSP Farms. The actual DSP allocation and partitioning are handled by the computer programming running in the system. The allocation of DSPs and partitioning of computing tasks are described in copending application entitled "System and Method for Distributing Processing Among One Or More Processors" filed on even date herewith, and assigned to the assignee of the present application, and the disclosure of which is herein incorporated by reference. These functions may be obtained from third parties as well. The user can thus request any quantity of any types of functions, up the limit of the available number of DSPs in the system. Should the user require more computing "horsepower", additional DSP Farms can be added to the system. The present invention may have four DSPs to a Farm Card.

Other systems that have on-board signal processing are nonexpandable in this regard, and the DSP resources are pre-defined in their roles. The DSP card in the WaveFrame system, for example, is dedicated to EQ, mixing, compression and reverb functions. The user cannot reconfigure the card to do anything else. The system described in U.S. Pat. No. 5,357,511 provides each DSP handling I/O, mixing, and connection bus interfacing. Although the system described in the patent allows DSPs to be connected via their connection bus, the function of each DSP does not change.

The system of the present invention is also cost-effective in construction. It is cost effective because it uses commercially available components (Motorola 56001 DSPs, NCR SCSI Processors, etc.) which reduce development time, costs and risks. It is cost effective due to the way in which tasks are partitioned among the DSPs. Users only have to acquire those modules or cards they need. It is cost effective because the DSP Farms eliminate the need for a great deal of expensive external signal processing equipment and mixing equipment. It is cost effective because it is powerful and compact enough that professional users can actually use it to completely replace older modes of working. Other products require that the user still have a fair amount of older equipment present, such as mixing consoles and external signal processing equipment, to complete the system.

The system's disk drives co-exist with the native file system running on the host computer. In prior art systems, the DAW's disk drives are connected in one of two ways: (1)They are completely private to the DAW, and so files on these drives are not visible to the host computer, its operating system, file system or file management system. The user cannot "see the DAW disks oh their computer's desktop", nor can they use the operating system's built-in tools to manage (delete, rename, duplicate, move, backup and restore, etc.) files on those disks. The benefit of this approach is that the DAW does not have to contend with the host computer for access of these drives, and thus their performance can be finely tuned, be predictable and repeatable; and (2) The DAW drives can be any drives that are attached to the host computer's normal disk controller. The DAW relies on being able to share access to those drives with the host computer's operating system. If the host computer needs to access the drives for too long or too frequently, the DAW may be unable to play or record audio data without interruption. The benefit of this approach is that the user can make use of the operating system's file management tools—the disks and files on them behave like any other disks and files the computer can see, so there is no relearning or special tools required.

The present invention combines techniques to yield the advantages, with none of the disadvantages of the prior art. In the present invention, a separate disk controller and set of disks is used to store audio information, allowing high-performance, predictable and repeatable performance and system customization. However, a driver for the private disk controller allows the host computer's operating system to see any disks attached to that controller as normal disks. The driver is a standard Macintosh operating system-level disk driver available from Apple Computer, Inc., Cupertino, Calif. It implements block-level, reads, writes and control calls to and from any attached disk drives it knows about. It is essentially a piece of code that allows the operating system to access data on a disk drive without having to know how to program the disk controller the hardware to which they are attached. Such drivers are well documented and known to those skilled in the art. Thus, all disks and files on the private disk controller appear on the user's desktop, and can be manipulated with the operating system's standard file management tools. However, during audio playback and recording, the present invention does two things that are not possible under the other scenario discussed above:

(a) it "throttles", or limits the host computer's access to the private disk controller to a small, limited bandwidth, so that the host computer can access those disks, albeit more slowly, without disturbing audio recording or playback; and (b) it sends private commands to the disk controller to tell it where on the disks to read and write the audio data, bypassing the host computer's operating system. This allows more optimized and predictable performance of the attached disk drives by not having to use the host computer's operating system to access the audio data on those disks during recording or playback.

Overall System Hardware Architecture

The hardware system consists, in the preferred embodiment, of a series of NuBus cards that fit in the computer's expansion slots, or in the expansion slots of any device intended to augment the computer's native expansion slots. Each card in the preferred embodiment has a connector to the computer's expansion bus (in this case the Apple Computer NuBus) for power and control information. In other embodiments, audio data may be transferred over this bus as well. Each card also has a connector to the connection bus (which is preferably a TDM bus, to be described below) for sharing data between the modules of the system and allowing system modularity, expandability and reconfigurability.

The connection bus allows the simultaneous transmission of 256 independent channels of data between any devices attached to it. All 256 channels of data are synchronized both with respect to each other, and with the overall system clock, which may vary over time. The connection bus is preferably implemented as a ribbon cable that runs over the tops of the cards, with an in-line connector attached to each card. Other forms for the connection bus are feasible and are well known to those skilled in the art. Any external I/O boxes attach via cables to connectors on the end of the cards that support them. Third parties can make their own cards which conform to the system specifications and allow connection-to both the expansion and connection busses. The connection bus is preferably of a type known as a time division multiplex (TDM) bus whose overall architecture is well known in the art and was developed by AT&T's Bell Laboratories in the 1940s. TDM is described in U.S. Pat. No. 4,574,845 issued to Baranyai et al.

One of the cards in the system is programmed to be the clock master, and its clock, usually taken from an attached I/O interface box, is placed on the connection bus so that all connected devices can share the same clock. If this master clock is modulated by an external device (usually to maintain synchronization with a separate system), all connected devices will track the modulations exactly.

Overall System Software

The system software consists of several distinct components:

(a) Application Software

This is the computer programming the user would acquire to perform the specific task he or she requires to be implemented on the DAW, such as music sequencing or digital audio recording, editing and playback. This software implements the user interface that is seen and used by the user, and is the user's main "connection" to making changes within the system. Much of the commercially available application software is written by third parties, allowing the system to function as a platform for application development, just as the computer itself functions as a platform for system development. For the purposes of illustration, one type of appropriate application software is called StudioVision and is available from Opcode Systems, Inc. of Palo Alto, Calif.

(b) Engine Software

The engine computer programming can be considered as a large shared library that any number of application software packages can make use of. The engine programming communicates directly with and controls the operation of the hardware in the system. The application programming must make calls to the engine programming to do anything with the system. The engine programming in one respect is a device independent software abstraction of the underlying hardware system. It allows the application programming to focus on available services, rather than programming hardware. Some of the engine programming controls the Disk Processors which allow digital audio to be read or written on the attached hard disks. Other portions of the engine programming performs the allocation of general purpose digital signal processing (DSP) resources in the system. Yet another portion of the engine programming controls the usage of the TDM connection bus, and allows connections to be made and broken between modules or cards on the system: The programming engine is preferably the DAE (Digidesign Audio Engine) and is incorporated in systems sold by Digidesign, Inc. The DAE operates much like a computer operating system in that it is a collection of software objects that implement the functions described, presenting a standard API (Application Programming Interface) to client applications. It is usually implemented as a stand alone interface-less application on a Macintosh or as a DLL (Dynamic Linked Library) on an IBM PC-compatible machine running the Microsoft Windows operating system.

(c) DSP Function Software

These pieces of software are typically thought of as programmed "plug-ins" in that the user can add them to the system at any point. If a new function is required, the user need only drop a file into a specific host computer system folder to make it available to the system. Like application software, there are many third party companies that supply DSP functions. A DSP function typically runs on a general purpose DSP on a DSP farm card, or runs on a special-purpose third party card that attaches via the connection bus.

Having described the main features of the system of the present invention, attention is now drawn to FIG. 1 which shows one possible configuration of cards in the computer system of the preferred embodiment. It illustrates the host computer 10, the connection of both the expansion 12 and connection busses 14 to each card in the system, and four different types of cards 16, 18, 20 and 22 that preferably may be contained in the system. The expansion bus 12 may be of any type desired, but preferably is a NuBus expansion bus or other available expansion bus for personal computers, such as those available from Apple Computer, Inc. A given system 24 can have any combination of zero or more of each of those four types of cards. Since each type of card handles a specific function, the user can assemble a system to meet his or her specific functional needs by combining different quantities of each type of card. For example, each Disk I/O card 16 and Bridge I/O card 18 can support an I/O box (26 and 28) containing up to 8 independent input and output channels. Analog inputs may be made into I/O box 26 through an audio interface or station 27 which may contain A/D and D/A converting circuitry well known to those skilled in the art. A Disk I/O card 16 can in addition support up to 7 connected disk drives 30 and can read and/or write up to 16 channels of audio data to or from any of those disk drives. Each Sample Playback card 22 can play back up to 32 simultaneous voices of sampled sound. Each DSP farm card 20 preferably contains four independent general-purpose DSPs for mixing and signal processing functions, although this number may be changed at the desire of the system designer. Any number of DSP Farm cards 20 may be utilized in the system 24, depending on the amount and type of processing tasks desired. If a user needs to process 48 channels of data to/from disk, 32 channels of I/O, and 12 DSPs for mixing and signal processing, it can be seen that a system composed of 3 Disk I/O cards, 1 Bridge I/O and 3 DSP farms would meet the user's needs.

Because all of the components and cards in the system are connected together via the TDM connection bus 14, all channels of disk data, sampler data and I/O data are available to all DSPs mounted on the DSP farm cards 26 for mixing and processing. Each disk channel, input channel, output channel and signal processor can be individually patched together in any way needed to meet the user's needs at the time. Those skilled in the art will appreciate that the amount of processing, I/O and disk bandwidth that can be handled in this system can be expanded greatly by the addition of further specific application cards, and that the expansion is cost effective, being tailored to the user's specific needs. In addition, those skilled in the art will appreciate the flexibility afforded by the variable interconnection of components and modules, allowing the system to be used in many situations, rather than a few specific ones.

FIG. 1 illustrates that cards in the system 24 are connected bidirectionally to both the expansion bus 12 and the connection bus 14. This means that no single card needs to process all of the data on the TDM connection bus 14, although the possibility is not ruled out. The processing within the system can be as distributed as is needed by the user. Since all DSPs contained in their respective DSP farm cards 20 in the system have access to all data on the TDM connection bus 14, and since all disk data and I/O data can be written to and read from that same bus, any signal can be routed anywhere within the system 14. In addition, the processing of any signal on the bus can be done in a distributed fashion by multiple processing elements connected via the connection bus. Techniques for multiprocessing among the DSPs in the system are described in a copending application for a "System and Method of Distributing Processing Among One Or More Processors", the disclosure of which is hereby incorporated by reference. For example, audio data will be read from a hard disk drive by a Disk I/O card, and then placed on the TDM connection bus 14. It can be read from the connection bus 14 by a DSP 32 on a DSP farm card 20, and this DSP may perform some type of mixing or signal processing on that audio data, and place the result back onto the connection bus. Additional processing stages may occur via other DSPs in exactly the same way. Finally, the processed data may be taken from the connection bus 14 and sent to a digital to analog converter by a Bridge I/O card 18.

The Host CPU in FIG. 1 (which may be one of the commercially available CPUs which are supplied with computers from Apple Computer, Inc.) is responsible for running the user interface software that allows the user to control and configure the system. It also provides control information for the Disk Controllers and DSPs on the cards in the system, as well as providing control information for configuring the connection of devices to the connection bus. The Host CPU in the preferred embodiment is a personal computer, such as an Apple Macintosh, and the control bus is a PC expansion bus, such as the NuBus. Each of the cards in the system is a circuit card connected to the PC expansion bus. The connection bus is an additional bus connected between the same cards, and may be, as described above, a TDM bus.

Figure 2:
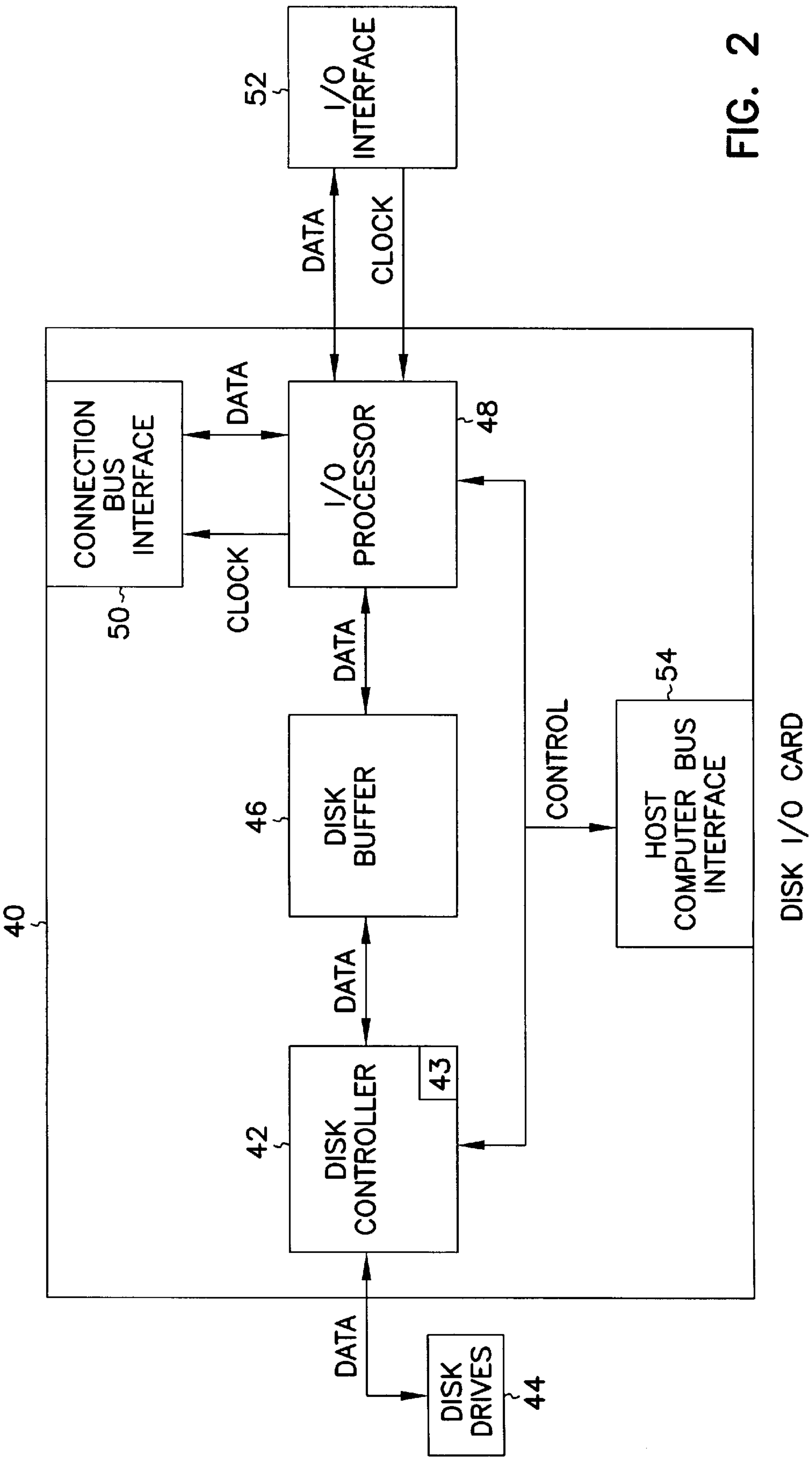
FIG. 2 is a description of a disk I/O card used with the computer system of the present invention.
Figure 3:
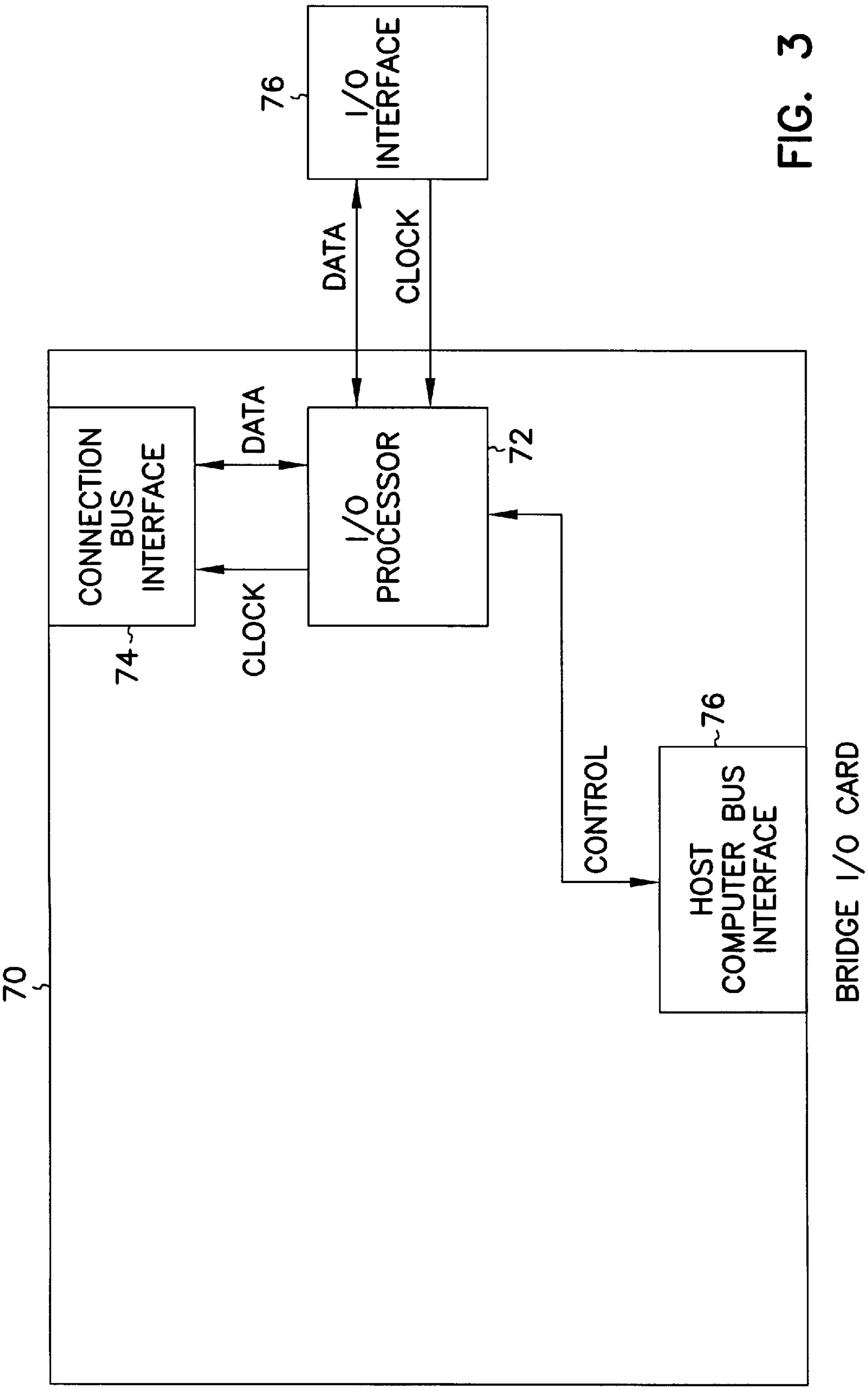
FIG. 3 is a bridge I/O card used in connection with the computer system of the present invention.

In the preferred embodiment for the Disk I/O card 40, shown in FIG. 2, the Disk Controller 42 writes data to, and reads data from, any attached disk drive(s)44. The disk data from the controller 42 is placed into and taken from a large block of memory called the disk buffer 46 as well as from the private memory 43 within controller 42. The I/O processor 48, usually a DSP being used only for data shuffling rather than processing, moves data between the Disk Buffer 46, the connection bus 14 of FIG. 1 through interface 50, and the I/O interface 52. Suitable DSPs for this purpose are models 56001 and 56002 available from Motorola, Inc. of Schaumburg, Ill. The I/O interface 52 is connected via a digital cable to an external box, into which analog or digital audio and clock signals can be connected. Up to 8 individual input and 8 individual output channels can be transmitted over the I/O interface cable. The Host Computer Bus Interface 54 is connected to the host computer expansion bus 12 of FIG. 1 and allows the host computer 10 to read and write control information to both the disk controller 42 and the I/O processor 48. The connection bus interface 50 allows the I/O Processor to read and write any of the 256 channels of data present on that bus. The number and function of time slots is well described in the literature as well as in the above-referenced U.S. Pat. No. 4,575,845 to Baranyai et al. It is also described in Tanner et al. "An Object Oriented System for Digital Audio Workstation DSP Development", *Proceedings of the Audio Engineering Society*, October 1993. Data that it reads from the connection bus can be written to the disk via the disk buffer 46, or sent to an output via the I/O interface 52. Data that it writes to the connection bus can come from the disk via the disk buffer, or from an input via the I/O interface.

The disk controller 42 may be any type of intelligent SCSI controller, IDE controller or any other type of disk controller, such as an NCR 710 model. It connects directly to one or more compatible disk drives via either a connector on the end of the circuit card, or a connector on the card used to connect to disk drives that are mounted within the computer enclosure itself. The disk controller in the preferred embodiment internally contains a RISC processor, and uses both internal and external attached RAM for its control program and data, as well as for data being read or written from or to attached disks. The disk controller's program data is initialized and updated by the host computer via the host computer expansion bus connector. The host computer assembles a list of the physical sectors on the disks it wants to be read or written, along with pointers to where the data should be read into or written from. These pointers usually refer to locations within the shared block of RAM called the disk buffer, but may also refer to locations in the private RAM attached to the disk controller. The disk controller executes its program by performing the requested reads and writes. This reading and writing happens in parallel with the operation of the host computer 10 and the I/O processor 48, so even extremely heavy disk activity will not slow down the system.

In most systems that have their own disk controller and thus do not use the host computer's disk controller, the host computer's operating system does not "see" the audio system's disks or the files on them. As a result, the host computer will not try to access them when the audio system is playing or recording. Such accesses could potentially cause the disks to be unable to keep up with the audio data requests, causing audio operations and overall DAW performance to fail. The disadvantage of hiding the audio disks from the host computer's operating system is that the files on them cannot be seen and managed using the tools available through the host computer's operating system. For example, the files and disks do not appear on the user's "desktop", and therefore cannot be named, moved, copied, deleted, etc. The audio system must provide custom software that provides these services, and is never integrated or identical to the way in which the user expects.

In the preferred embodiment, the advantages of prior art techniques are obtained, with none of the disadvantages. Although the audio disks are attached to a private disk controller, a low level operating system disk driver well known to those skilled in the art, allows the computer's operating system to see and access all of the disks and files attached to that disk controller. When the audio system is recording or playing back, the host computer software and disk driver will interleave disk access requests from the operating system with those of the audio system software in such a way that the DAW software obtains a guaranteed amount of the disk controllers time, with any remaining time being allocated to the operating system. In such a case, the operating system will run more slowly when making disk accesses to audio disks while audio playback or recording is occurring, but neither system will fail, and all the advantages of having the audio disks visible to the operating system are obtained.

The disk buffer 46 is a large block of memory that is shared between the disk controller 42 and the I/O processor 48. In the preferred embodiment, it is implemented as 2 megabytes of DRAM. The disk buffer 46 allows large blocks of data to be read from or written to the disks, which is very efficient from the disk's perspective, while very small blocks are read or written more frequently by the I/O processor, which is more efficient from the I/O processor's perspective.

The I/O processor, in the preferred embodiment, may be a Motorola 56001 or 56002 DSP. It acts as a data shuffler, moving data between the disk buffer, the connection bus and the I/O interface. Its control program is downloaded from the host computer via the computer's expansion bus 12, and it has some local RAM attached to it which augments its internal program and data RAM. The I/O processor receives an interrupt once every audio sample period from a clock on the connection bus. At each interrupt, the I/O processor 48 reads audio samples from the disk buffer corresponding to the disk channels that are playing back. It writes audio samples to the disk buffer corresponding to disk channels that are recording. It reads audio samples from the I/O connector corresponding to audio channels that are being input into the system, and writes audio samples to the I/O connector corresponding to audio channels that are being output from the system. Any audio samples read from the disk buffer and the I/O connector can also be written to the connection bus so that other elements in the system may have access to them. Conversely, other elements in the system may have placed audio samples on the connection bus whose final destination is a disk or I/O connection on this disk I/O card, and the I/O processor will read those samples from the connection bus and route them to their respective destinations on the card. The control and routing information is downloaded to the I/O processor by the host computer via the computer's expansion bus.

The connection bus interface 50 in the preferred embodiment is implemented by circuitry which operates a parallel time division multiplex (TDM) bus. A number of commercially available products implement a TDM bus system, but preferably the circuitry is that circuitry sold by Digidesign, Inc., and is described in copending applications entitled "TDM Network Interface Apparatus and Method" and "An Apparatus and Method For Accessing Memory In A TDM Network", both filed on even date herewith, the texts of which are incorporated by reference into this application. There are 256 time slots on this bus as referenced above, and all 256 time slots are transmitted across the bus to all devices connected to it at every sample period, regardless of whether the sample clock varies. The connection bus interface is mapped into the I/O processor's address space, so that the I/O processor can read and write all control and data registers easily, with no interruption to the bus. The connection bus, I/O processor, I/O interfaces, disk controller and host CPU all operate independently and in parallel. This parallelism greatly increases the processing power of the system over prior art approaches that use a central controller.

The I/O interface 52 has connectors on it for both analog and digital inputs and outputs. Analog inputs and outputs may have consumer (¼ inch phone plugs) or professional (XLR) connectors, and be operating at consumer (−10 dB) or professional (+4 dB) relative levels. The analog signals may be balanced (differential) or unbalanced (single-ended).

The digital inputs and outputs conform to the AES/EBU (professional) and S/PDIF (consumer) physical and logical formats. In the preferred embodiment, a Digidesign 882 Studio, 882 I/O or 888 I/O interface available from Digidesign, Inc. of Menlo Park, Calif. may be used. Thus, audio data may be input into the network 24 of FIG. 1 through a first audio interface or station operatively connected to the I/O Interface 52 and output to another audio interface or station, again through the I/O Interface 52. The bridge I/O card 70 is identical to the Disk I/O card 40 but with its Disk Controller and Disk Buffer removed. The purpose of the bridge I/O card is to allow the user to add more input/output capability to the system without incurring the expense of the more powerful disk I/O card with its larger number of components. The components which are present on the bridge card, an I/O processor 72, connection bus interface 74 and host computer expansion bus interface 76 are described in relation to those components in FIG. 2 and will not be further described here. It is a result of the basic system design philosophy of the present invention that by building a system out of multiples of specific parts, rather than multiples of identical, fully-featured parts, cost is minimized and performance is optimized.

Figure 4:
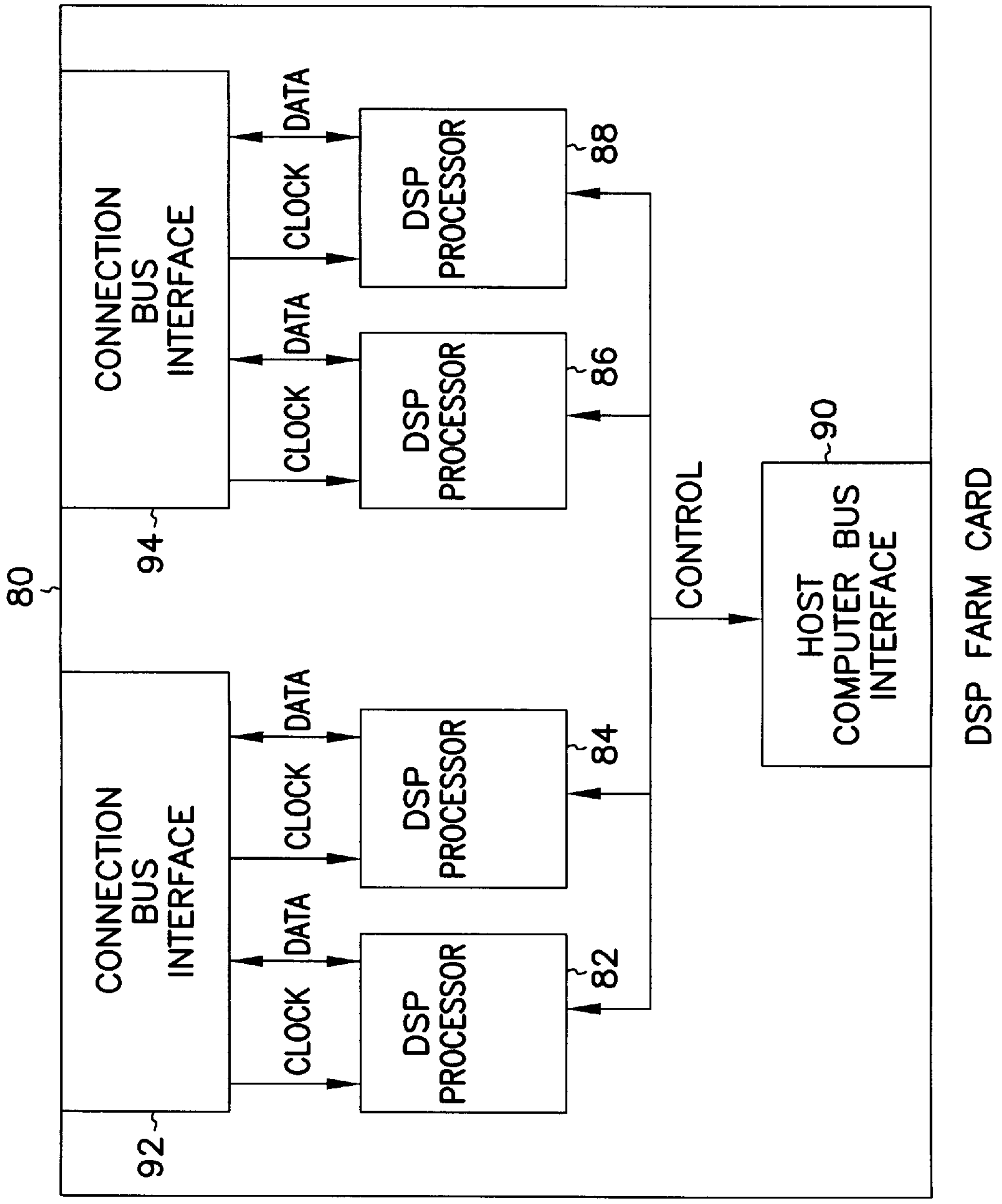
FIG. 4 is a DSP farm card used in connection with the computer system of the present invention.

The DSP farm card 80, shown in FIG. 4, is the system component that provides general purpose, unassigned processing resources. Any type of mixing, signal processing, signal synthesis or analysis that the system requires can be done on one or more DSPs 82, 84, 86 and 88 on one or more of these cards. It is called a "farm" card because it houses a plurality of processors which may be called upon to perform a variety of tasks.

In the preferred embodiment shown in FIG. 4, there may be four Motorola 56001 or 56002 DSPs 82, 84, 86 and 88 on each DSP Farm card 80. Each DSP may have some private external RAM attached to augment their internal RAM. Each DSP and its external RAM are also connected to the host computer's expansion bus via the host computer expansion bus interface 90 on the DSP farm. The host computer can load software and processing parameters into the DSP and its RAM via this interface.

In addition, each pair of DSPs shares a connection bus interface 92 and 94. In the preferred embodiment, each of the two DSPs 82 and 84, 86 sharing a connection bus interface 92 and 94 respectively, is given access to it via the DSP's external memory bus for one-half of each sample period. However, in other embodiments, no such sharing may be required or desired. The start of each DSP's access period is indicated by an interrupt derived from the connection bus clock and applied to each DSP. On the TDM bus, there are several clock signals available. Two signals can be derived such that one signal always goes active at the start of each sample period and the other always goes active in the middle of such sample period. The two signals are the same but offset in time by one-half of a sample period. One signal goes to an interrupt pin of one DSP, and the other signal goes to an interrupt pin of the other DSP of a pair. The operation of the signals and the interrupts are further described in copending applications entitled "TDM Network Interface Apparatus" and "Apparatus and Method For Accessing Memory In A TDM Network", the disclosures of which are incorporated by reference herein and filed on even date herewith. A significant advantage of this relationship is that great cost savings can be realized by sharing connection bus interfaces with little or no performance penalty. This is true because each DSP spends a relatively small portion of each sample period accessing data on the connection bus, and the vast majority of its time processing that data. Thus, in operation, audio data may be launched into the system 24 and along TDM bus 14 through an audio station or interface connected to the I/O Interface 52 of the disk I/O card 40. The audio data is then distributed for processing through the TDM bus 14 among the DSPs mounted on one or more DSP farm cards 80, and the resultant processed audio data output to an audio interface or station attached to the I/O Interface 52, again through TDM bus 14. This provides the distribution of processing and mixing tasks among the individual DSPs on a farm card or, in the case of multiple cards, among the DSPs on the plurality of farm cards.

Figure 5:
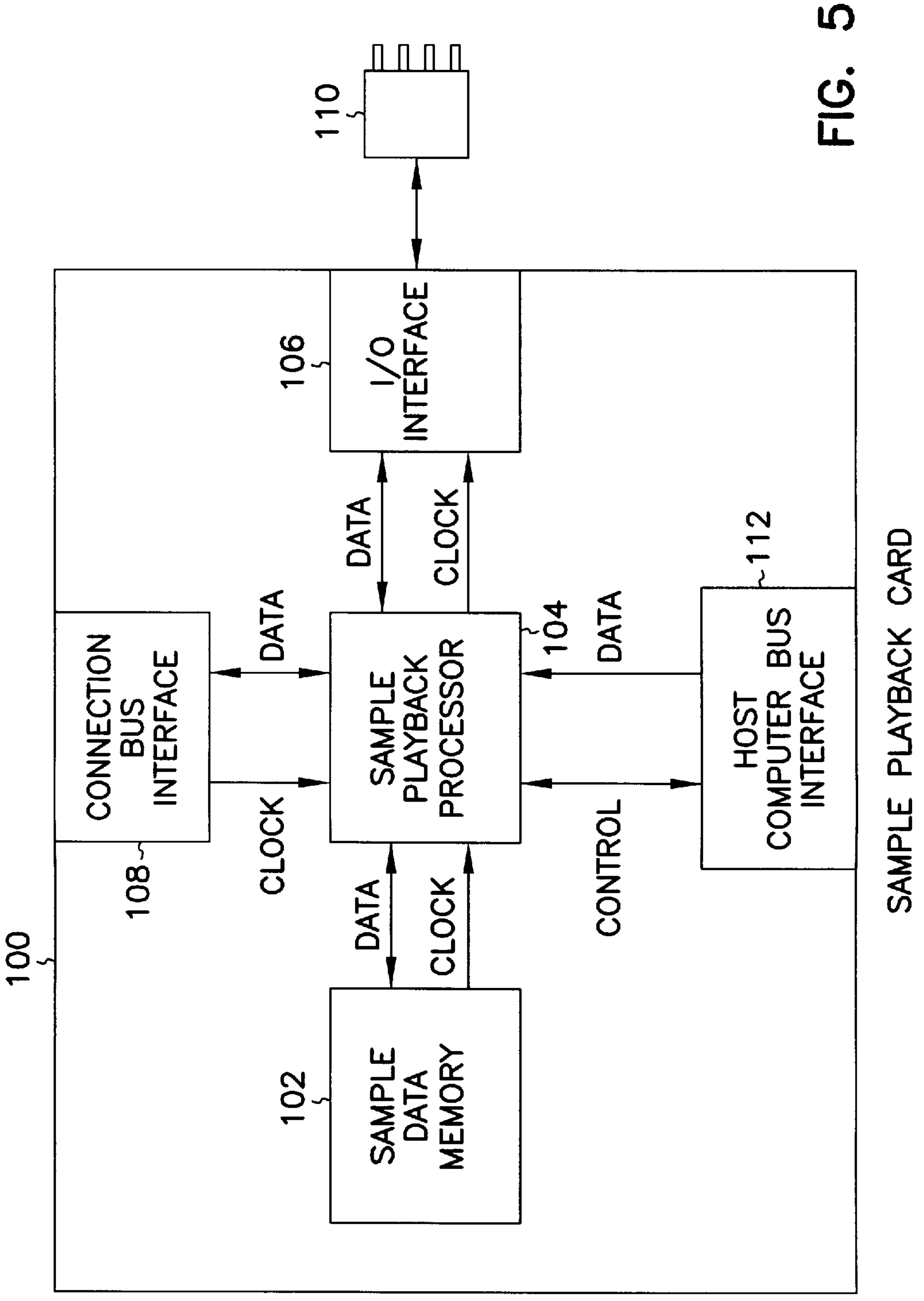
FIG. 5 is a sample playback card used in connection with the computer system of the present invention.

Turning now to FIG. 5, the figure illustrates a sample playback card 100 which in the preferred embodiment may be a Digidesign SampleCell II card available from Digidesign, Inc. of Menlo Park, Calif. Its function is to play back multiple concurrent streams of digital audio, which is stored in its sample data memory 102. It is helpful to understand the history and usage of a sample playback device in order to understand its operation.

Typically, a sample playback device, commonly referred to as a "sampler" (earlier devices also recorded, or "sampled" the sound as well as played it back), is used more as a musical instrument rather than an audio recorder. In this function, a short digital recording of a single note of an instrument, such as a piano, is stored in a portion of the sample data memory. The sampler can change the pitch of the sound as it is playing it back by playing it faster or slower (much like changing the speed of a tape or record), so that the entire range of notes on a piano can be played from the recording of just a single note. In reality, more than one note is stored, since changing the pitch too far from the original tends to make the result sound unnatural. The sampler's processor 104, embodied on the Digidesign Sample Cell II and referred to above, is fast enough that it can play back many such voices at one time, each with its own pitch. Thus, if the user plays 10 notes on a keyboard, the sampler can play back 10 simultaneous notes of the piano sound, each with its own different pitch. The ability to derive many notes from a single stored note, along with the ability to play multiple voices simultaneously makes the sampler a very efficient form of sound generation.

Of course, any sound can be recorded and played back from the sampler's memory, in the same manner as it would be from a hard disk. Some uses of a sampler are exactly this type, however most disk drives offer 10 or 20 times the storage capacity that a typical sampler's memory offers.

In the preferred embodiment, the audio data is stored in the sample data memory 102, implemented as a variable size bank of DRAM. This memory is directly connected to the sampled data processor 104. This processor accesses the RAM in real time to produce up to 32 simultaneous voices of data. The processor internally applies some mixing and other processing, such as amplitude, pan, pitch, enveloping and other modulation. The processor has up to 8 channels of outputs, which are sent to both analog and digital outputs through I/O interface 106.

The analog output section consists of 8 digital to analog convertors, whose analog output is presented at 4 stereo ¼ inch phone plugs 110 at the rear of the sampler card. The digital outputs are routed to the connection bus interface 108, where they can be written to any 8 channels of the 256 channels available on the TDM connection bus.

The host computer interface 112 is used to load the sample data memory with digital audio data, to provide control parameters and data for the sample processor, and to control the actual playback of data by the sample processor itself.

There are significant advantages to integrating a sampler with the rest of the audio system. Previously, a user would be required to have an external sampler in a box, and mix its audio outputs with those of other devices by using an external analog mixing console. The mixed output of the mixing console would then typically be stored back onto tape. Each conversion of a digital signal to analog, and each storage on tape or routing through a connector caused additive noise, distortion and degradation to the signal. Routing of signals required the construction and use of cables, and integration with other pieces of equipment was not possible.

In the preferred embodiment, all audio is kept in digital form at all stages of the process. By placing the sampler's digital outputs on the system's TDM connection bus 14 (FIG. 1), they are available to all other components of the system 24. For example, processing the sampler's outputs via a DSP on a DSP Farm, or mixing the sampler's outputs with playback channels from hard disk are now trivial operations. All control over the entire process, including programming and operating the sampler itself as well as the rest of the system, is done from the host computer's user interface. The benefits are reduced system cost and size, increased audio quality and flexibility, more efficient production process and shorter learning curves.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A modular system for processing digital audio data, comprising:

a host computer having an expansion bus for transferring computer digital data and control signals; a separate interconnection bus for transferring the digital audio data;

a set of audio modules all coupled to the expansion bus for transferring the computer digital data and the control signals between the modules and the host processor and all coupled to the interconnection bus for transferring the digital audio data among all the audio modules, each of the modules being adapted to processing the digital audio data according to a subset including less than all of a set of different audio functions, and any one of the audio modules being adapted to transfer the digital audio data on the interconnection bus to any different one of the audio modules for performing a function not performable by the one audio module.

2. A modular system according to claim 1, wherein a first of the audio modules performs a set of digital processing functions upon digital data transferred exclusively over the interconnection bus from and to another of the audio modules.

3. A modular system according to claim 2, wherein a second of the audio modules performs the function of interfacing a storage medium for storing the digital audio data.

4. A modular system according to claim 3, wherein the second audio module includes the storage medium.

5. A modular system according to claim 2, wherein a second of the audio modules performs an input/output function upon the digital audio signals for transferring audio signals from and to external audio inputs and outputs.

6. A modular system according to claim 5, wherein the second audio module further converts the audio signals from and to the digital audio data.

7. A modular system according to claim 2, wherein a second of the audio modules performs sample playback functions upon the digital audio data.

8. A modular system according to claim 7, where the sample playback functions include mixing multiple simultaneous voices of the digital audio data in real time.

9. A modular system according to claim 2, wherein the first audio module includes at least one programmable digital signal processor for performing any of a plurality of the processing functions.

10. A modular system according to claim 1, wherein the interconnection bus is a time-division multiplex bus having a number of time slots each having an address.

11. A modular system according to claim 1, wherein multiple ones of the audio modules perform the same subset of the set of functions.

12. A method of processing digital audio data in connection with a host processor having an expansion bus and a separate interconnection bus, comprising:

receiving the digital audio data from an audio input in a first module coupled to both of the buses, the first module being incapable of performing any substantial digital processing on the digital audio data other than possibly converting it to and from analog form;

transferring the digital data from the first module over the interconnection to a second module coupled to both of the buses;

performing digital processing upon the same digital data in the second module, the second module being incapable of performing any other substantial functions on the digital audio data;

transferring the digital data from the second module over the interconnection bus to another module coupled to both of the buses;

transmitting the digital audio data to an audio output in the other module.

13. A method according to claim 12, where the other module is the first module.

14. A method according to claim 12, further comprising:

transferring the digital data over the interconnection bus to a third module coupled to both of the buses;

storing the digital audio data in the third module, the third module being incapable of performing any substantial digital processing on the digital audio data.

* * * * *